United States Patent [19]

Schueller

[11] Patent Number: 4,734,962
[45] Date of Patent: Apr. 5, 1988

[54] ADJUSTABLE STATIC RELEASE LINK

[75] Inventor: Gerald W. Schueller, Hennepin, Minn.

[73] Assignee: Honeywell Inc., Minneapolis, Minn.

[21] Appl. No.: 866,669

[22] Filed: May 27, 1986

[51] Int. Cl.[4] .............................................. A44B 17/00
[52] U.S. Cl. .................................. 24/602; 24/241 PP; 24/574; 24/598
[58] Field of Search ........ 24/602, 230.5 W, 230.5 TP, 24/241 PP, 241 SP, 242, 232 G, 574

[56] References Cited

U.S. PATENT DOCUMENTS

| 113,689 | 4/1871 | Norcross | 24/232 |
| 228,628 | 6/1880 | Grassick | 24/232 |
| 1,373,235 | 3/1921 | Giberson | 24/232 |
| 1,517,019 | 11/1924 | Serl | 24/232 |
| 1,842,593 | 1/1932 | Edwards | 24/232 |
| 2,218,932 | 10/1940 | Collins | 24/232 |
| 2,256,164 | 9/1941 | Mahoney | 24/241 PP |
| 2,994,300 | 8/1961 | Grahling | 24/300 |
| 3,540,089 | 11/1970 | Franklin | 24/602 |
| 4,612,687 | 9/1986 | Barwood | 24/602 |

Primary Examiner—Victor N. Sakran
Attorney, Agent, or Firm—Roger W. Jensen

[57] ABSTRACT

Link means for automatically releasing a static line from a torpedo launching aircraft.

1 Claim, 2 Drawing Sheets

ADJUSTABLE STATIC RELEASE LINK

This invention relates to the field of aeronautics, and particularly to apparatus for launching marine torpedos from aircraft in flight.

The practice has been to prepare a parachute pack, containing the torpedo and a parachute, and to discharge the pack from an aircraft with a static line connected to the aircraft, so that when the pack is sufficiently displaced from the aircraft, the line causes the parachute to open and then is broken.

In this procedure, it is desirable that no broken end of the static line remain connected to the aircraft after the parachute is released, and for this purpose the line may be connected to the aircraft by a releasable link. This invention comprises an improved releasable link which automatically and resiliently releases the static line from the aircraft in response to the force exerted on the line by the inertia of the moving pack when the line is fully extended, so that the entire line remains attached to the dropping pack.

Various features of novelty which characterize the invention are pointed out with particularity in the claims annexed hereto and forming a part hereof. However, for a better understanding of the invention, its advantages, and objects obtained by its use, reference should be had to the drawing which forms a further part hereof, and to the accompanying descriptive matter, in which there is illustrated and described a preferred embodiment of the invention.

IN THE DRAWINGS

Referring first to FIGS. 1 to 4, a link 10 according to the invention is shown to comprise a body or loop 11 of metal from which a pair of legs 12 and 13 extend in the same direction. The legs are spaced by a distance d greater than the diameter of a static line.

Figure 1:
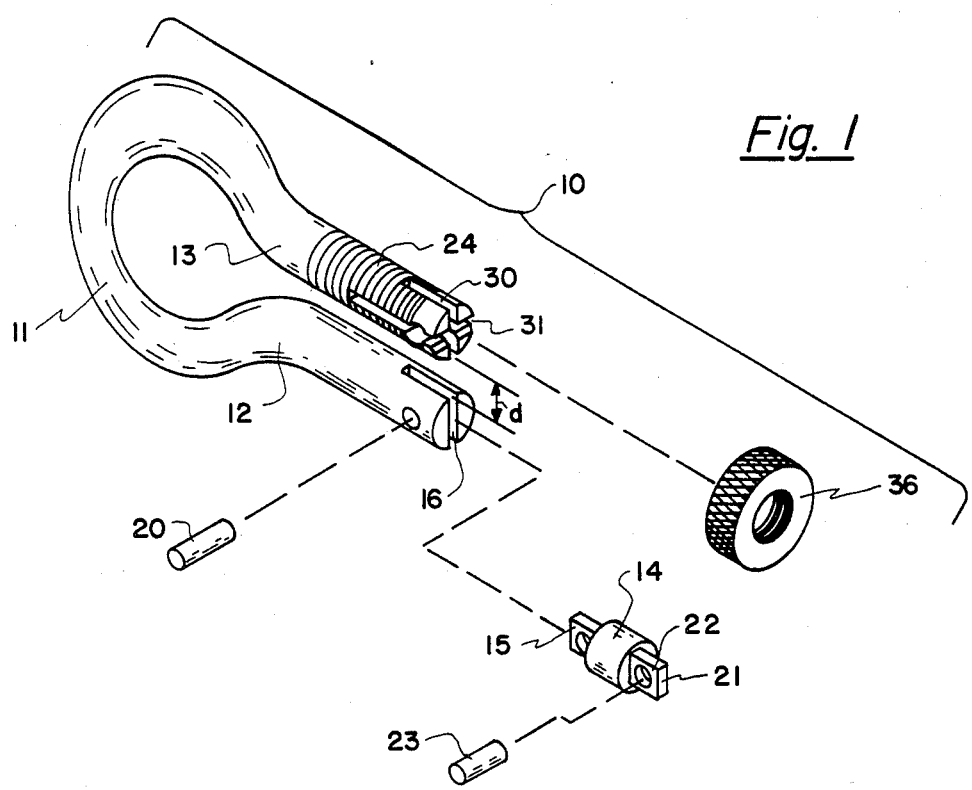
FIG. 1 is a prespective view of a link according to the invention, partially assembled.
Figure 2:
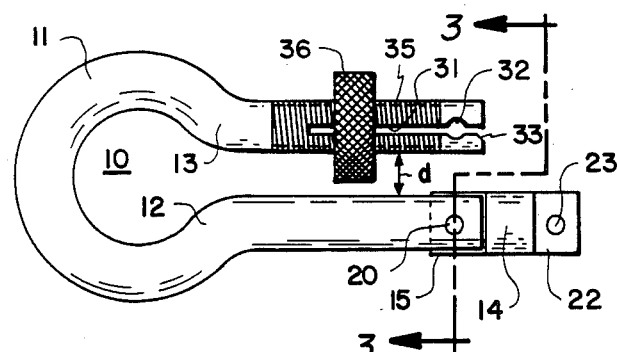
FIG. 2 is a side view of the link in its open position.
Figure 3:
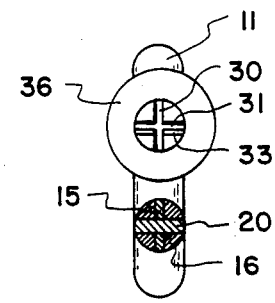
FIG. 3 is a sectional view along the line 3—3 of FIG. 2.
Figure 4:
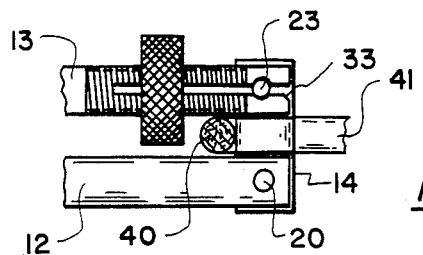
FIG. 4 is a fragmentary view showing the link in its closed condition.

Link 10 also includes a short cylindrical bar 14 which pivots between a first or open position, shown in FIG. 2, in which it clears the space between legs 12 and 13, and a second or closed position, shown in FIG. 4, in which it bridges the space between the legs. For this purpose, bar 14 is provided at one end with a flat 15 which fits in a slot 16 in the end of leg 12, to which it is pivoted at a pin 20. The other end of bar 14 is also provided with a flat 22, and a detent pin 23 is secured therein to project beyond the flat in both directions.

The end of leg 13 is cross-slotted: a first, shallow slot 30 extends parallel to slot 16 in leg 12, and is sized to receive flat 22 of bar 14. A second slot 31 extends more deeply into leg 13 and intersects a bore 32 into which pin 23 is laterally received on pivotal movement of bar 14 into its closed position. The resilience of the walls of slot 31 is sufficient to enable this, and the end of the slot may be relieved as at 33 to facilitate the movement of pin 23 into bore 32. The outer surface of leg 13 is screw- threaded at 35 to receive an internally threaded manual knob 36 for adjusting the resilience of leg 13 and hence the force required to pivot bar 14 out of its closed position. Knob 36 may be provided with set screw or other suitable means to lock it in adjusted position when a desired resilience of the walls of slot 31 has been attained.

FIG. 4 is a fragmentary showing of my link 10 in use. The loop 40 of a static line 41 has been inserted between the legs 12 and 13, and bar 14 has been pivoted into the closed position, in which loop 40 bears against it and in which pin 23 is resiliently held in bore 32.

Figure 5:
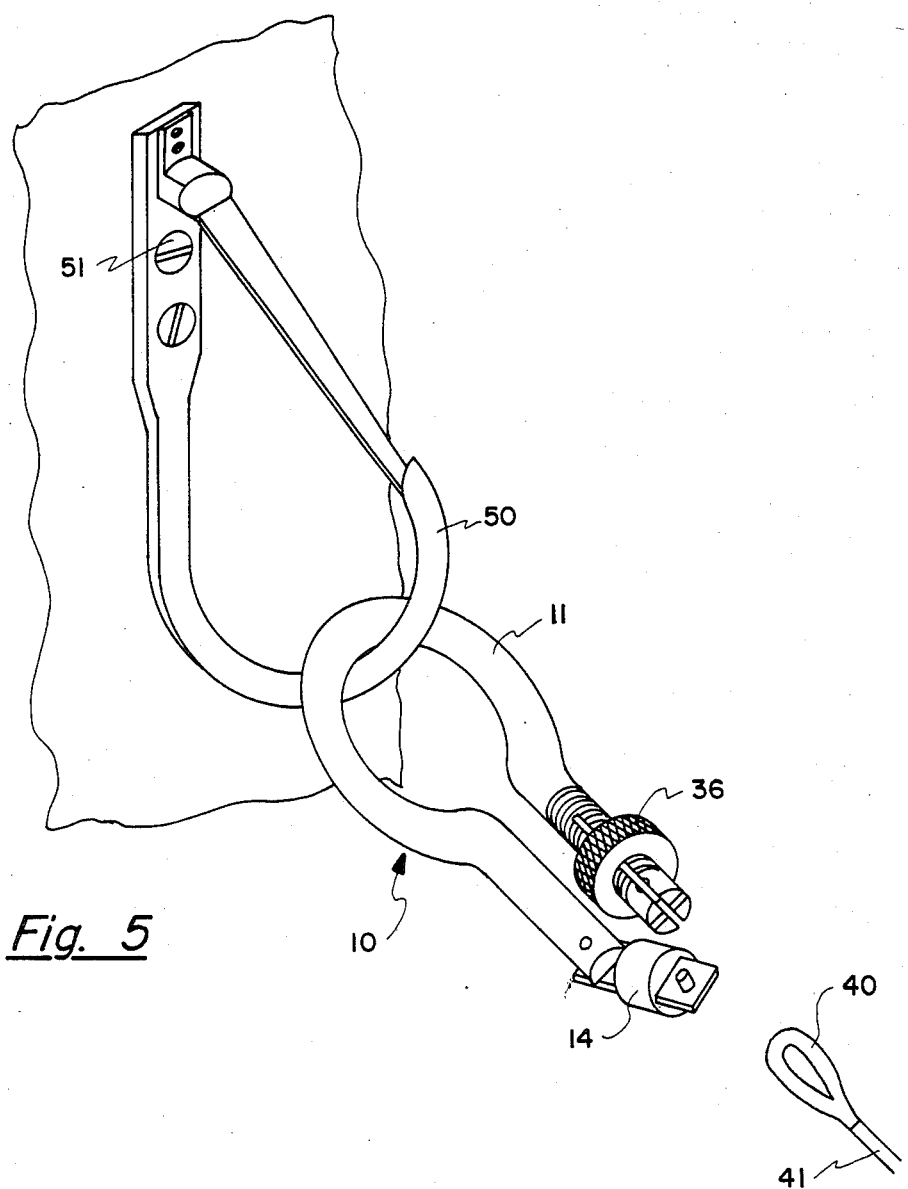
FIG. 5 is a fragmentary view showing the invention in use.

Attention is now directed to FIG. 5, which shows the intended operation of my releasable link. A hook device 50 is secured to the launching aircraft at 51. Each parapack to be launched is provided with a static line 41 ending in a loop 40 secured to one of my links 10 with its bar 14 in closed position.

Figure 6A:
FIG. 6 is a general showing of a torpedo launching operation using the invention.
Figure 6B:
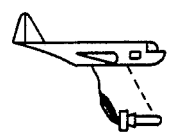
Figure 6C:
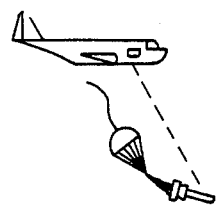

When it is desired to launch a parapack, loop 11 of its link 10 is placed over hook device 50: knob 36 has been set to provide a predetermined resilience in the grip on pin 23. At the desired time the parapack is discharged from the airplane, as shown in FIG. 6a. The static line remains fastened to the aircraft at link 10, and draws the pilot parachute out of the pack (FIG. 6b). The force acting on the static line continues to increase, however, until the loop 40 of the line exerts sufficient force on bar 14 to pull the bar into its open position, and the static line is released (FIG. 6c). Link 10 is now removed from hook device 50, and is ready to receive the loop of the static line of another parapack, since the link is self-contained, and no portion thereof has left the aircraft with the static line.

From the above it will be evident that I have invented a release link which is self-contained and which is adjustable to release at any desired applied force.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangment of parts, within the principle of the invention, to the full extent indicated by the broad general meaning of the terms in which the appended claims are expressed.

The embodiments of an invention in which an exclusive property or right is claimed are defined as follows:

1. A self-contained releasable link comprising:
   (a) a loop-like body member having first and second spaced apart legs each having a substantially round cross-section and integral with and extending longitudinally from said body member, said spaced apart legs being parallel to one another and each terminating with an end at substantially equal longitudinal distances from said body member, and said body member and said legs defining a plane;
   (b) a relatively short bar member having two ends, said bar member having on the first end thereof a flat and a pin projecting perpendicular to said flat from both sides thereof;
   (c) means permanently pivotally mounting said second end of said bar member on said end of said first of said legs, said pivotal mounting means permitting said bar member to be rotated in said plane, and said flat being oriented relative to said pivotal mounting means so that said sides thereof are parallel to said plane;

(d) a first slot in said second of said legs extending from said end thereof longitudinally toward said body member a substantial preselected distance, the sides of said first slot being substantially perpendicular to said plane; and (e) a second slot in said second of said legs extending from said end thereof longitudinally toward said body member a preselected distance, said second slot being oriented so that the sides thereof are substantially parallel to said plane;

(f) thread means on the exterior surface of said second leg extending longitudinally toward said body member;

(g) an internally threaded knob member mounted on said second leg in operative engagement with said thread means; and (h) a bore through said second leg near the end thereof, said bore being in substantial alignment with said first slot and of a diameter substantially (i) greater than the height of said slot and (ii) the same or the diameter of said pin;

whereby said bar member may be pivoted about said second end as aforesaid into a ready release position whereby said flat of said bar member is disposed in said second slot and said pin is disposed in said bore, said knob member being manually rotatable to move said knob member longitudinally along said second leg to vary the relative resiliency of the engagement of said pin in said bore.

* * * * *

UNITED STATES PATENT AND TRADEMARK OFFICE
CERTIFICATE OF CORRECTION

PATENT NO. : 4,734,962
DATED : April 5, 1988
INVENTOR(S) : Gerald W. Schueller

It is certified that error appears in the above-identified patent and that said Letters Patent is hereby corrected as shown below:

Column 1, line 3, after the Title, insert --The Government has rights in this invention pursuant to Contract No. N00024-83-C-6254, awarded by the Department of the Navy.--

Signed and Sealed this

Ninth Day of April, 1991

Attest:

HARRY F. MANBECK, JR.

Attesting Officer

Commissioner of Patents and Trademarks